(12) United States Patent
Heigl

(10) Patent No.: US 6,457,745 B1
(45) Date of Patent: Oct. 1, 2002

(54) GAS BAG WITH TETHER MEANS

(75) Inventor: Jürgen Heigl, Böbingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/436,868

(22) Filed: Nov. 9, 1999

(30) Foreign Application Priority Data

Nov. 9, 1998 (DE) ..................... 298 19 999 U
Sep. 23, 1999 (DE) ..................... 299 16 823 U

(51) Int. Cl.⁷ ............................................. B60R 21/16
(52) U.S. Cl. ................................. 280/743.2; 280/728.1
(58) Field of Search ..................... 280/743.2, 730.2, 280/728.1, 743.1, 749; 112/440, 438

(56) References Cited

U.S. PATENT DOCUMENTS

| | | | |
|---|---|---|---|
| 5,141,787 A | * | 8/1992 | Yamamoto ................. 428/35.5 |
| 5,421,610 A | * | 6/1995 | Kavanaugh et al. ...... 280/743.1 |
| 5,454,595 A | * | 10/1995 | Olson et al. ............. 280/743.1 |
| 5,489,119 A | * | 2/1996 | Prescaro et al. ......... 280/743.2 |
| 5,642,905 A | * | 7/1997 | Honda ..................... 280/743.2 |
| 5,826,905 A | * | 10/1998 | Tochacek et al. ........ 280/743.1 |
| 6,022,046 A | * | 2/2000 | Isomura et al. .......... 280/743.2 |
| 6,135,493 A | * | 10/2000 | Jost et al. ................ 280/730.2 |
| 6,145,879 A | * | 11/2000 | Lowe et al. ............. 280/743.1 |
| 6,170,871 B1 | * | 1/2001 | Goestenkors et al. .... 280/743.1 |

* cited by examiner

Primary Examiner—Brian L. Johnson
Assistant Examiner—J. Allen Shriver
(74) Attorney, Agent, or Firm—Tarolli, Sundheim, Covell, Tummino & Szabo L.L.P.

(57) ABSTRACT

A gas bag for a vehicle occupant restraint system comprises two superimposed plies of fabric (12, 14) and a tether secured to the plies of fabric and defining the spacing between them in the inflated condition. The tether is formed by a seam (22b) implemented with a thread slack.

12 Claims, 3 Drawing Sheets

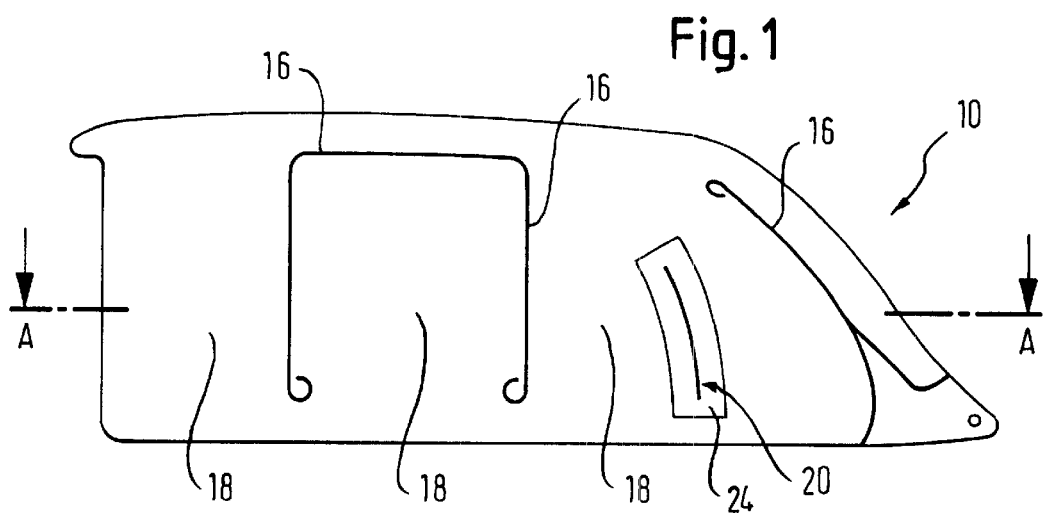
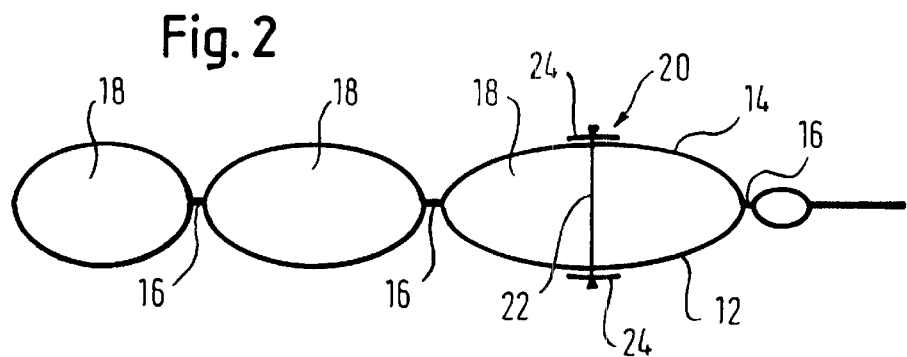
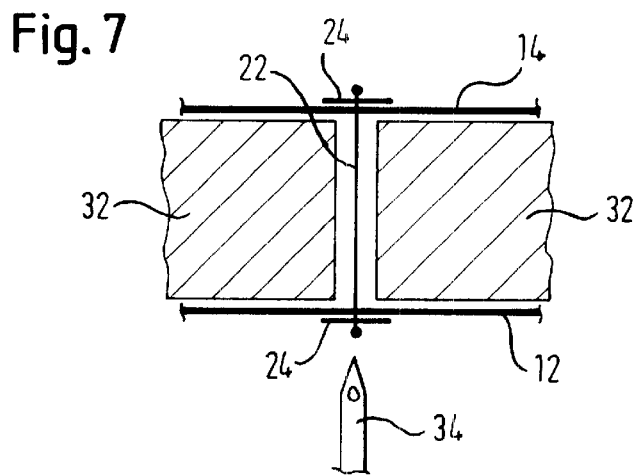

GAS BAG WITH TETHER MEANS

The invention relates to a gas bag for a vehicle occupant restraint system.

The shape of an inflated gas bag may be influenced and controlled by internal tethers. Each of these tethers is sandwiched between two superimposed plies of fabric to which it is stitched, or woven by a special weaving technique. In any case, such internal application of tethers involves considerable production time and costs. When the tethers are secured to the plies of fabric by seams, these seams need to be implemented through the inflation port of the gas bag. Weaving the internal tethers to the superimposed plies of fabric necessitates a special weaving technique which is highly complex.

The invention provides a gas bag for a vehicle occupant restraint system, the internal tether means of which may be applied with minimum production time and costs. In accordance with the invention the internal tether means are formed by at least one seam through the plies implemented with a thread slack. Such a seam having thread slack may be implemented from without into the superimposed plies of fabric which may thus be spread out flatly on top of each other in applying the seam and enabling a conventional stitching technique to be employed.

In the folded condition of the gas bag the thread slack of the seam forms loops arranged between the plies of fabric or on the outer side of one of the plies of fabric. On inflation of the gas bag the thread slack is pulled out until the loops are eliminated. The plurality of tensioned threads in the interior of the gas bag act like a tether which limits the expansion of the gas bag in the direction of extension of the threads. Since applying a seam with thread slack involves little outlay in production, engineering novel configurations of the gas bag now comes into consideration which would be too complicated with conventional tethers. It is thus now possible with no great outlay to apply a number of seams with thread slack acting as tether means on the gas bag which on deployment and expansion of the gas bag control the shape thereof up into its rim portions.

Particularly suitable types of seam are the double lock stitch seam and the double chain stitch seam. In both cases the thread. slack is preferably formed in the underthread.

In a head bag a sufficient, possibly constant, gas bag thickness needs to be provided over the entire restraint portion, i.e. the portion on which impact of a vehicle occupant is to be reckoned with. Currently the thickness of the individual restraint chambers of the head bag is defined by the spacing of seams defining the chambers in the bag. These seams directly join the plies of fabric. This technique usually represents a compromise between gas bag thickness, volume and probable place of impact of the head of a vehicle occupant which on no account must impact a nip seam. However, it is usually not possible to do without nip seams in a restraint portion.

Due to the mandatory requirement of ensuring that the occupant's head does not impact a nip seam, an adequate gas bag thickness needs to be made available throughout all of the restraint portion to permit achieving the same restraint everywhere. The bracing and stiffening of the gas bag offered by the chambering due to nip seams should be retained or achieved by other means.

In any case, however, applying tethers internally involves a considerable production outlay. When the tethers are seamed to the plies of fabric, these seams need to be implemented through the inflation port of the gas bag. Spot fastening the tethers at both their ends has, on the one hand, a negative effect on achieving a constant thickness of the restraint portion and, on the other, high forces materialize at fastening points in the gas bag fabric which in a restraint situation could result in the gas bag being damaged. Weaving the internal tethers to the superimposed plies of fabric necessitates a special weaving technique which is highly complicated.

Using the inventive concept of tethers formed by seams with thread slack allows the bag to have a substantially constant thickness throughout all of the restraint area, whereby the gas bag can be fabricated simply and with no high handling requirement in production.

A seam having thread slack may be applied from the outside into the superimposed plies of fabric which may thus be spread out flatly on top of each other in applying the seam or seams and enabling a conventional stitching technique to be employed.

It is particularly advantageous in the folded condition of the gas bag to arrange the loops of the thread slack between the plies of fabric since this excludes any tangling of the loops due to external effects whilst likewise preventing the gas bag material possibly being damaged by the pull-through of the thread slack through the fabric during inflation of the gas bag.

In a further aspect of the invention for configuring the seam during stitching a spacer is temporarily arranged between the two plies of fabric of the gas bag to obtain a seam implemented with an extremely large slack. This spacer has practically the desired thickness of the inflated gas bag and is removed after stitching. The thread slack is thus achievable without any complicated stitching techniques. The slack thread of the seam is thus located, with the gas bag folded, in the interior of the gas bag and is not tensioned until the gas bag is deployed. In this way a tether function distributed over a large area is achievable without using many individual nip seams which would affect the restraining effect. The seam may also assume the chamber defining function. After having stitched the tether seam the rim seam of the gas bag may be fabricated with a seam material holder as hitherto.

In accordance with a further advantageous embodiment of the invention the tether means is configured as a tether structure comprising in all at least three fastening points on the two plies of fabric. For one thing, the higher number of fastening points reduces the load exerted by the tether means on the gas bag fabric in a restraint situation, and for another, a wealth of possibilities for configuring the shape of the gas bag is now made available by the choice in configuring the tether structure and the arrangement of the fastening points, this permitting engineering, more particularly, the tightening of the lower edge of a side gas bag. The tether means itself may be prefabricated outside of the gas bag to reduce the production outlay.

To advantage the tether structure is configured V- or X-shaped. A structure arranged V- or X-shaped in the inflated gas bag is simple to fabricate and to process with great freedom of arrangement in the gas bag.

In another advantageous embodiment the tether means is formed from a section in which folds of the fabric parts of the gas bag are stitched to each other. In this aspect no additional components are needed and the possibilities of configuring the shape of the gas bag are many and varied. Compartmenting the gas bag into chambers is also achievable.

In accordance with yet another advantageous embodiment the tether means is formed from a piece of material extending between the fabric parts, this piece of material preferably being circular. A piece of material may be secured to a larger surface area than a conventional tether to reduce the load on the gas bag fabric. This embodiment too, offers a wealth of possibilities of shaping the gas bag.

BRIEF DESCRIPTION OF THE DRAWINGS

Further advantages and features of the invention read from the following description of several embodiments of the invention with reference to the attached drawings in which FIG. 1 shows the gas bag in accordance with the invention in the spread-out condition;

FIG. 2 is a section through the gas bag in the inflated condition as taken along the line A—A in FIG. 1.

FIG. 7 is a schematic view of an arrangement for fabricating a seam with a large thread slack.

DETAILED DESCRIPTION

Figure 3:
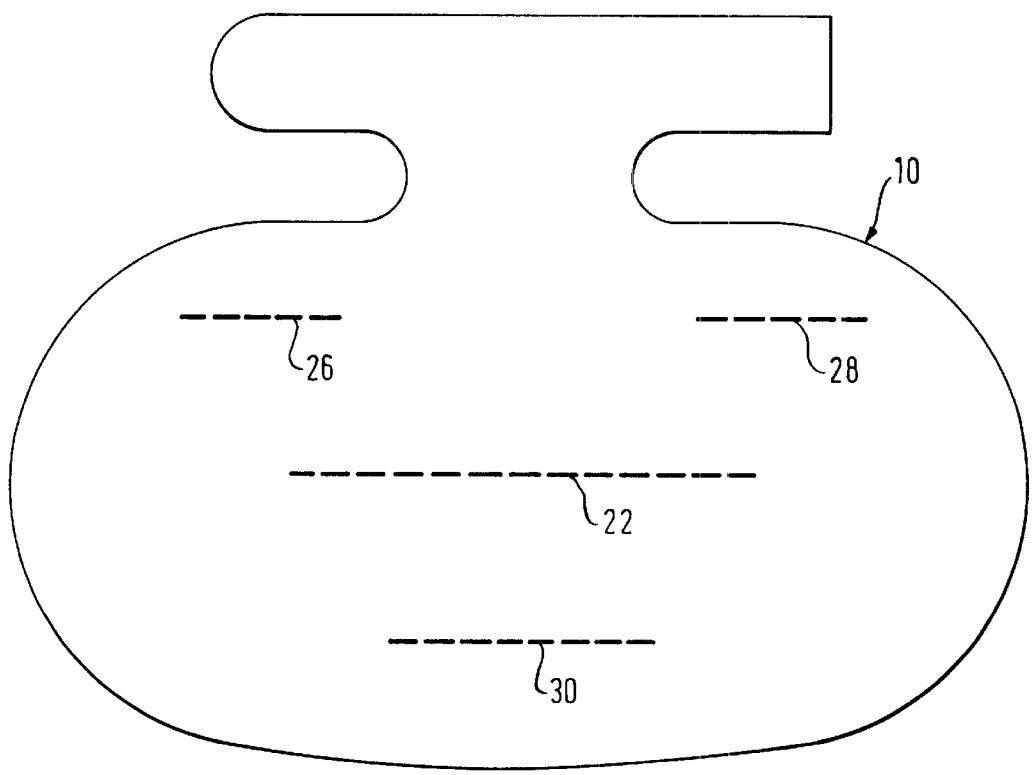
FIG. 3 is a schematic view of another aspect of the gas bag in accordance with the invention in the spread-out condition.

Referring now to FIGS. 1 and 2 there is illustrated a gas bag in accordance with a first embodiment of the invention.

The gas bag 10 shown in FIG. 1 spread out flat has two superimposed plies of fabric 12, 14 which may be configured integrally or stitched to each other at the edges. The gas bag 10 may be compartmented by nip seams 16 into chambers defining differing restraint portions 18. In addition, at least one tether means 20 regulating the space between the plies of fabric 12, 14 is provided which maintains the thickness of the gas bag in the corresponding restraint portion practically constant.

Referring now to FIG. 2 there is illustrated the gas bag as shown in FIG. 1 in a section view in an inflated condition. At the location of the nip seams 16 the two plies of fabric of the gas bag are directly in contact with each other whilst at the location of the tether means 20 the thickness of the gas bag 10 is set to the desired dimension.

In the first embodiment shown the tether means 20 is formed by a seam 22 having large thread slack. To protect the gas bag fabric, reinforcement plies 24 may be applied to the outer sides of the gas bag.

Figure 9:
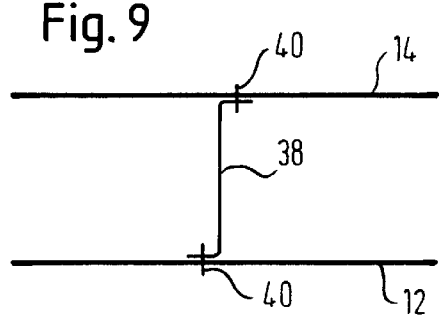
FIG. 9 is a section taken along the line A—A in FIG. 8 in using a conventional tether.

This seam 22 assumes the function of an internal tether of usual gas bag designs (see FIG. 9). Referring now to FIG. 3 there is illustrated an embodiment of the invention incorporating a seam 22 executed with thread slack arranged roughly in the middle of the gas bag 10, this seam extending linearly over the middle main portion of the girth area of the gas bag. Furthermore, additional tuck seams may be applied to the gas bag involving no major production outlay. In FIG. 3 only three further seams 26, 28, 30 are shown as an example by means of which the configuration of the gas bag is specifically definable in the inflated condition up into the rim portions.

Figure 4:
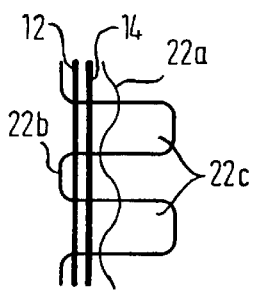
FIG. 4 is a schematic sectional view of two superimposed plies of fabric joined by a seam with thread slack, the thread slack being arranged in the form of individual loops on the outer side of one of the plies of fabric.
Figure 5:
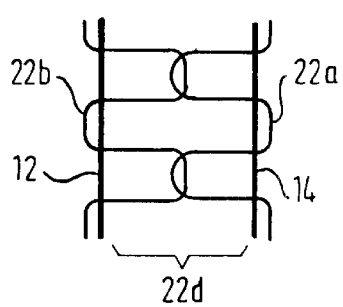
FIG. 5 is a section view of two plies of fabric joined by a seam with thread slack, the thread slack being formed by thread loops located between the plies of fabric.
Figure 6:
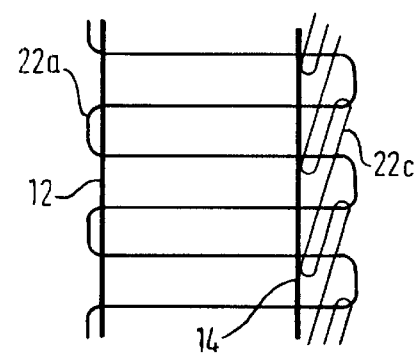
FIG. 6 is a section view of two plies of fabric joined by a seam with thread slack, the thread slack being formed partly between the plies of fabric and partly on the outer side of one of the plies of fabric.

Expedient embodiments of the seam 22 are illustrated in FIGS. 4, 5 and 6.

Referring now to FIG. 4 there is illustrated the embodiment of a seam 22 consisting of the top thread 22a and underthread 22b configured with thread slack formed by thread loops 22c located on one side of the fabric ply 14 on the outside.

Referring now to FIG. 5 there is illustrated the embodiment of a seam 22 consisting of the top thread 22a and underthread 22b with knotted thread overhangs 22d sandwiched between the plies of fabric 12, 14. In the embodiment as shown in FIG. 6 the seam 22 consists of the top thread 22a and underthread 22b, with the thread slack partly sandwiched between the plies of fabric 12, 14 and partly formed outside on one side of the fabric ply 14 in the form of thread loops 22c.

In the preferred embodiments the seam 22 is produced as a double lock stitch seam or a double chain stitch seam.

The seam 22 acts as a tether means for defining the expansion of the gas bag 10 between its plies of fabric 12, 14. Since the seam 22 is applied from without to the superimposed plies of fabric 12, 14, no extra expense is involved in engineering them in a length which may be far greater than the width of a conventional tether. The dynamic stresses occurring in the defining function are thus better distributed over the surface area of the gas bag than in the case of conventional spot-fastened tethers.

The dynamic properties of the gas bag may be further influenced by the nature of the thread as used for implementing the seams 16 to 22. When an elastic thread is employed the thread slack may be configured shorter.

Referring now to FIG. 7 there is illustrated a method of producing a seam having a large thread slack. Sandwiched between the plies of fabric 12, 14 are two spacers 32, the thickness of which substantially corresponds to the desired thickness of the gas bag. The spacers 32 leave the location open at which the seam is to materialize. Reinforcement plies 24 may be arranged on each outer side of the plies of fabric 12, 14. The seam 22 is implemented with a sewing needle 34 having a stroke corresponding to the thickness of the spacers 32. In this way the complete thread slack may be sandwiched between the plies of fabric 12, 14. The method as described may be adapted to the embodiments as shown in FIGS. 4 to 6 by suitably selecting the thickness of the spacers 32 and implementing the seam 22.

Referring now to FIGS. 8 to 13 there are illustrated further embodiments of a gas bag in accordance with the invention incorporating differing tether means.

It is to be noted that components like those of the first embodiments are identified by like reference numerals.

Figure 8:
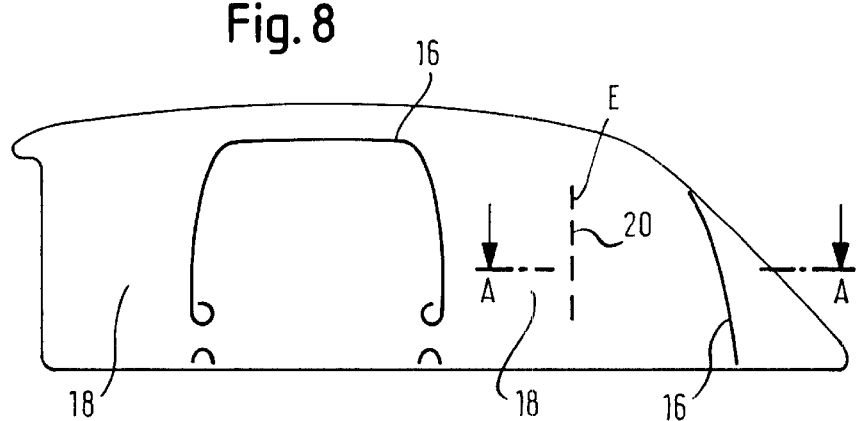
FIG. 8 shows a gas bag in accordance with the invention in accordance with further embodiments.

Referring now to FIG. 8 there is illustrated the gas bag 10 shown in its flat spread-out condition having two superimposed plies of fabric 12, 14 which may be configured integrally or stitched to each other at the edges. The gas bag 10 may be compartmented by nip seams 16 into chambers defining differing restraint portions 18. In addition, at least one tether means 20 regulating the spacing between the plies of fabric 12, 14 is provided.

FIG. 8 shows schematically the portion for arranging a tether means 20.

Referring now to FIG. 9 there is illustrated the arrangement of a conventional tether 38. The tether 38 is stitched in the interior of the gas bag 10 by its narrow sides to the plies of fabric 12, 14 (seams 40). The load in the restraint situation needs to be handled by only two spot fasteners. The possibilities of shaping the gas bag with such a conventional tether 38 are few, since there is little chance of attaining a large area effect, such as e.g. bracing with only two fastening points, and making use of several tethers 38 necessitates a high production outlay.

Figure 10:
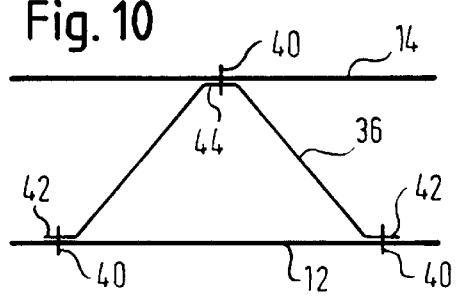
FIG. 10 is a section taken along the line A—A in FIG. 8 in using a V-shaped tether means.

Referring now to FIG. 10 there is illustrated an embodiment in which the tether means consists of a V-shaped tether structure 36. For this purpose a long strip of fabric is stitched by its narrow sides 42 to the one fabric ply 12 (seams 40) and in a middle portion 44 to the other fabric ply 14. All of the fastening points may be arranged in the plane E or located staggered therefrom. Just as well, the middle fastening point 44 may be shifted to one of the two narrow sides 42 in attaining an optimum shape of the gas bag. Since the fastening points 42, 44 form a single plane, this tether structure may be used to brace gas bag 10.

Figure 11:
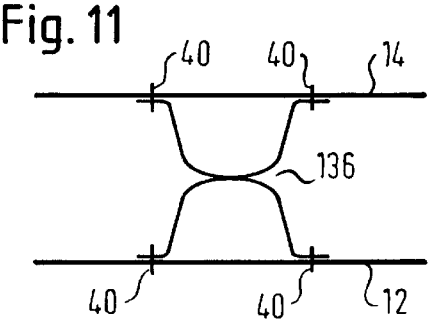
FIG. 11 is a section taken along the line A—A in FIG. 8 in using an X-shaped tether means.

Referring now to FIG. 11 there is illustrated yet a further aspect of the tether structure. Here, the tether structure 136 is X-shaped. This structure 136 may be prefabricated outside of the gas bag 10 to facilitate processing. Two ends each of the X are stitched to the one fabric ply 12, the other two to the other fabric ply 14, each with seams 40. With this structure 136 a practically constant gas bag thickness is achievable in each restraint portion 18 with simultaneous bracing of especially the lower rim of the gas bag 10.

Figure 12:
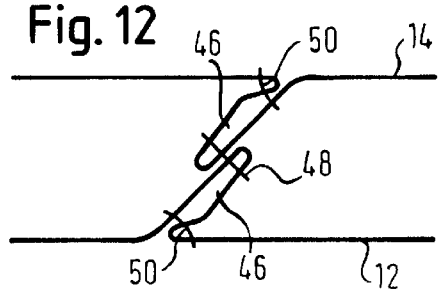
FIG. 12 is a section taken along the line A—A in FIG. 8, in which the tether means is formed by stitched folds of the fabric parts.

Referring now to FIG. 12 there is illustrated yet another possibility of configuring a tether means. In this case the tether means 20 is formed by folds 46 of the plies of fabric 12, 14 stitched to each other. The plies of fabric 12, 14 are cut correspondingly oversize and placed in folds 46. The folds 46 are then, for one thing, stitched to each other (seam 48) and, for another, nip stitched to the corresponding fabric ply (seams 50). Since the seams 48, 50 may be configured relatively long, here too the strain on the gas bag fabric is reduced in the restraint situation. Several such stitched folds 46 may also be provided. The stitched folds 46 may be put to use for chambering, with interruptions, where necessary, to permit a gas exchange between the individual chambers.

Figure 13:
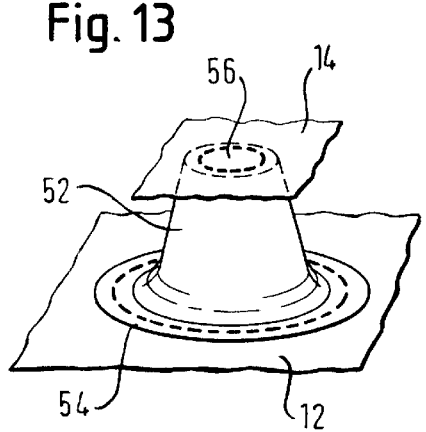
FIG. 13 shows a tether means formed by an additional fabric part.

Referring now to FIG. 13 there is illustrated still another possibility of configuring the tether means 20. In this case a circular piece of material 52, e.g. of a gas bag fabric, is stitched at its circumferential rim 54 to the one fabric ply 12 to thus form a large load zone and at a middle portion 56 to the other fabric ply 14 either likewise with a circular seam or only to individual locations. In the inflated condition of the gas bag 10 the piece of material 52 extends practically in the shape of a cone between the two plies of fabric 12, 14. Other shapes for the piece of material 52 are also conceivable.

What is claimed is:

1. A gas bag for a vehicle occupant restraint system comprising two superimposed plies of fabric, at least one tether means defining a spacing between said plies of fabric in an inflated condition of said gas bag, said tether means being at least one seam, said seam being defined by at least one thread extending through portions of said plies of fabric, said thread having a slack portion, said two fabric plies being spaced apart a distance less than a length of said at least one thread prior to inflation of said gas bag, said two fabric plies sliding relative to said at least one thread during inflation of said gas bag to take up said slack portion.

2. The gas bag as set forth in claim 1 wherein said slack portion of said seam is located on one outer side of said gas bag as long as the bag is not inflated.

3. The gas bag as set forth in claim 1, wherein said slack portion of said seam is sandwiched between said two plies of fabric as long as said gas bag is not Inflated.

4. The gas bag as set forth in claim 1, wherein said seam is implemented as a lock stitch seam.

5. The gas bag as set forth in claim 1, wherein said seam is implemented as a double lock stitch seam.

6. The gas bag as set forth in claim 4, wherein said slack portion is formed in the underthread of said seam.

7. The gas bag as set forth in claim 1, wherein said seam is implemented as a chain stitch seam.

8. The gas bag as set forth in claim 1, wherein said seam is implemented as a double chain stitch seam.

9. The gas bag as set forth in claim 7, wherein said slack portion is formed in the underthread of said seam.

10. The gas bag as set forth in claim 1, and forming an inflatable side curtain.

11. A method of producing a seam implemented with a thread slack in a gas bag for a vehicle occupant restraint system including two superimposed plies of fabric, and at least one seam through said plies of fabric implemented with the thread slack to define a spacing between said plies of fabric in an inflated condition wherein at least one spacer having substantially a thickness of a desired thickness of said inflated gas bag is introduced during stitching between said two plies of fabric and removed after stitching.

12. An occupant restraint system for helping to protect an occupant of a vehicle, said restraint system comprising:

an inflatable gas bag having first and second fabric layers superimposed on each other, each of said first and second fabric layers having an outer surface and an inner surface opposite said outer surface, the inner surfaces of said first and second fabric layers facing each other, at least one tether means comprising a thread and a first reinforcement means sewn onto the outer surface of said first fabric layer, and a second reinforcement means sewn onto the outer surface of said second fabric layer, said thread having two end portions, one of said two end portions extending through said first fabric layer and said first reinforcement means, the other of said end portions extending through said second fabric layer and said second reinforcement means, said thread having a middle portion extending between said first and second fabric layers, said first and second reinforcement means and each of said end portions of said thread being visible from the outer surface of said first and second fabric layers, said first and second fabric layers being spaced apart a distance less than the length of the middle portion of said thread prior to inflation of said gas bag, said middle portions of said thread thus having slack, said first and second fabric layers sliding relative to said thread during inflation of said gas bag to take up said slack.

* * * * *